Feb. 23, 1965    G. BLUMENSCHEIN    3,170,612
GARDEN TOOL HOLDER
Filed Oct. 19, 1962    3 Sheets-Sheet 3
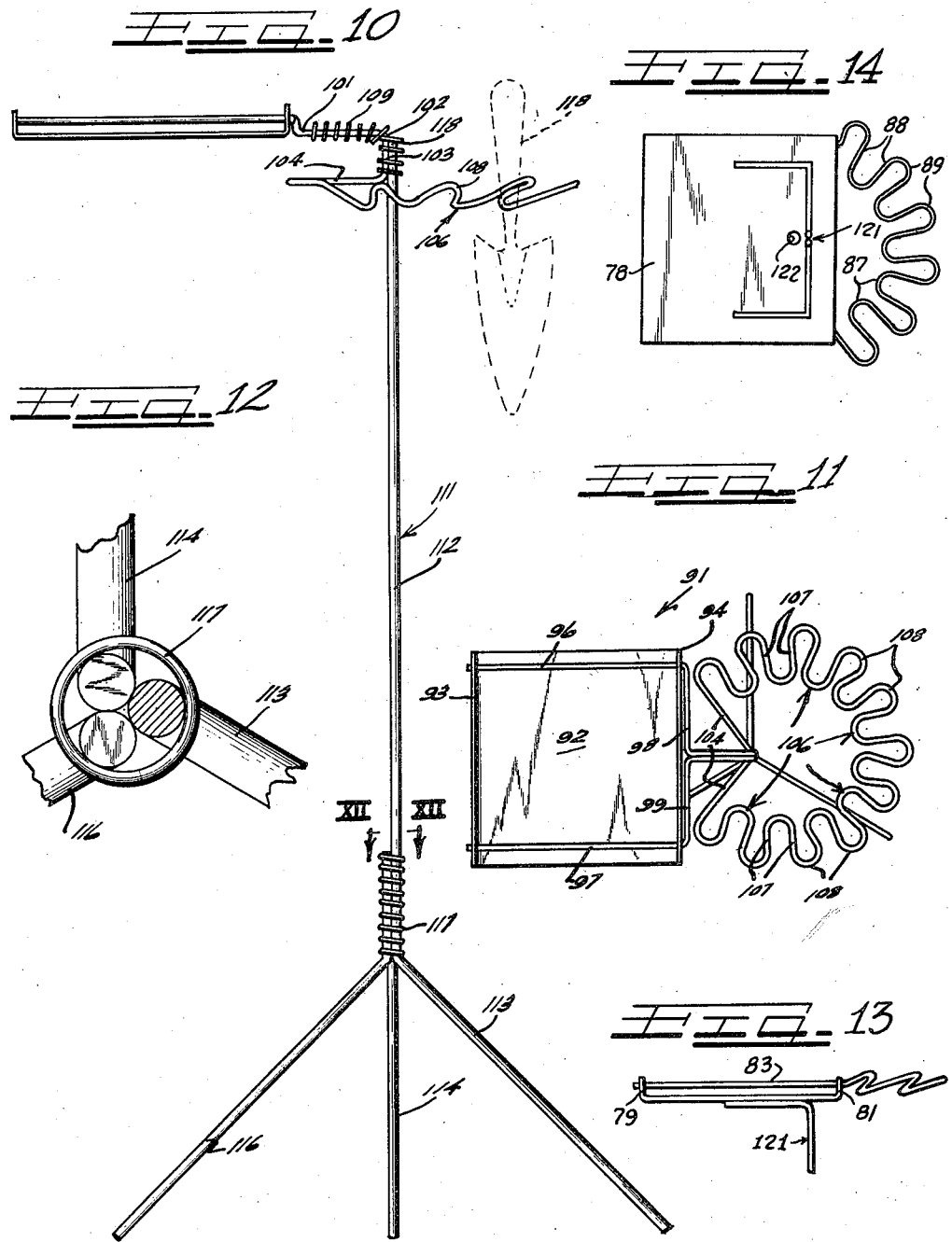
INVENTOR.
GORDON BLUMENSCHEIN
BY
ATTORNEYS

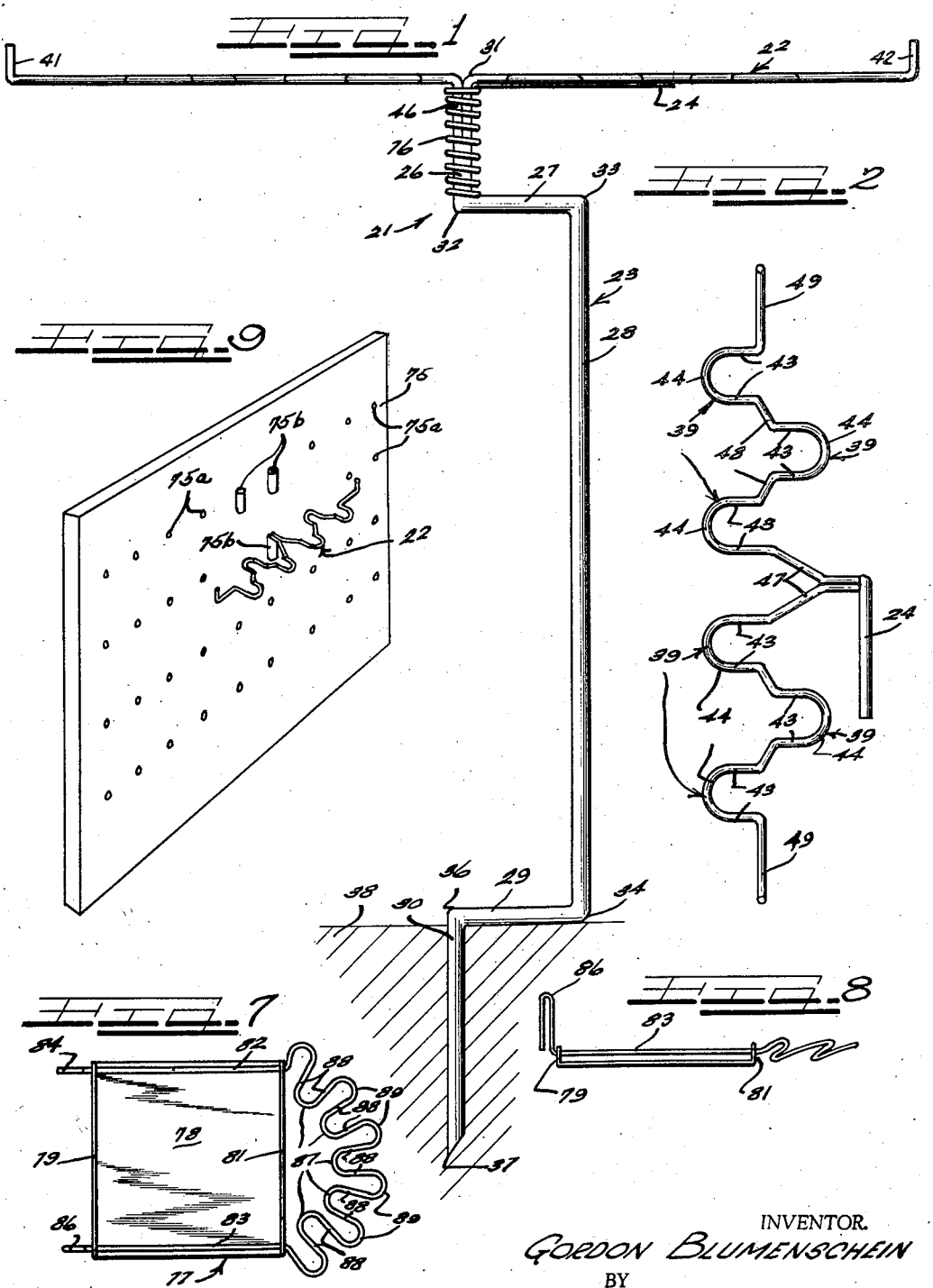

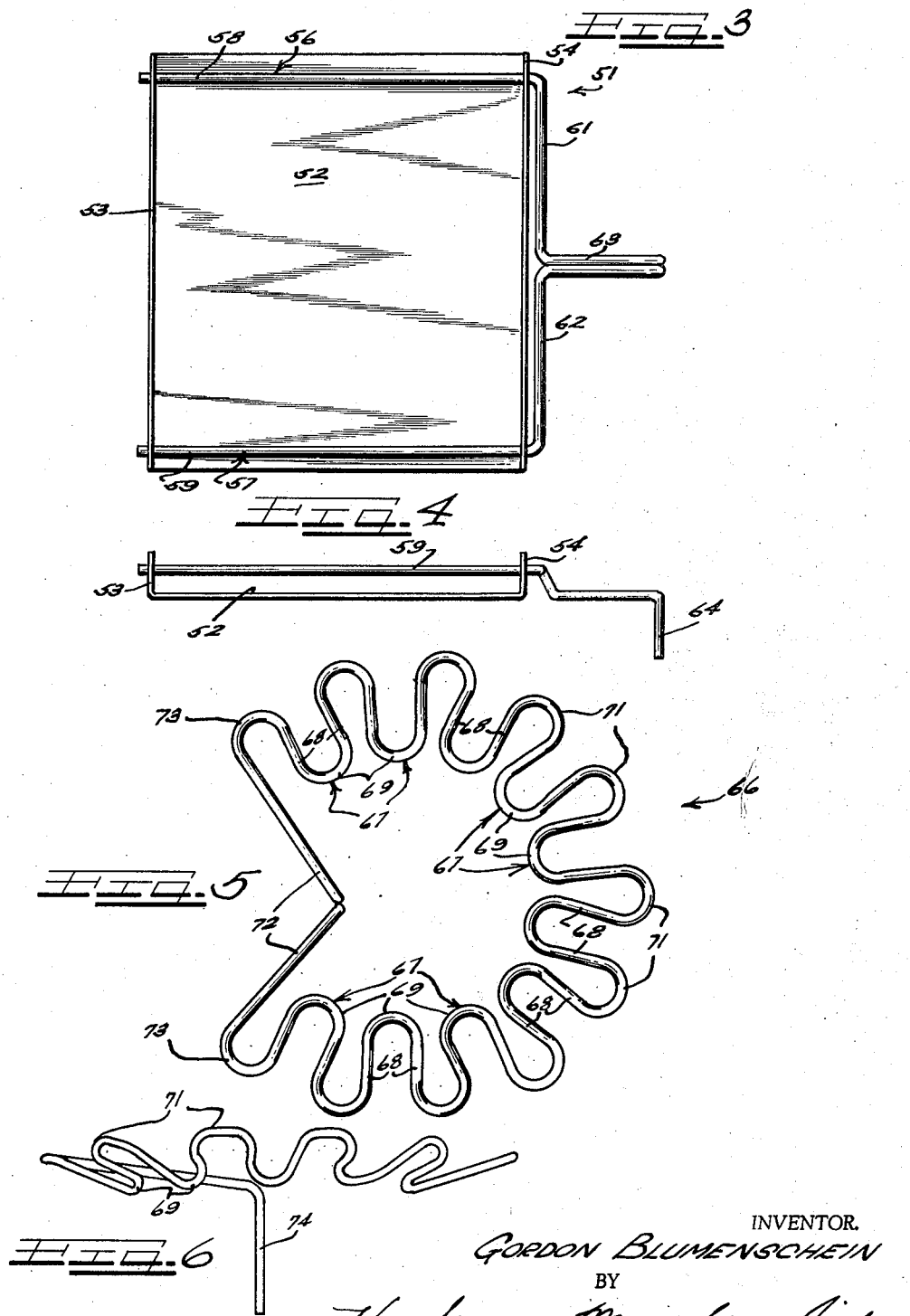

United States Patent Office 3,170,612
Patented Feb. 23, 1965

3,170,612
GARDEN TOOL HOLDER
Gordon Blumenschein, P.O. Box 122, Lake Villa, Ill.
Filed Oct. 19, 1962, Ser. No. 231,685
13 Claims. (Cl. 224—45)

This invention generally relates to a portable holding means and more particularly relates to a portable tool holding means.

Known tool holders of the garden variety are unable to meet the demands of the housewife who watches over her flowers with delicate care. These garden tool holders were complex, bulky, held the tools improperly, and failed to meet the requirements of versatility. The holders could only be effectively used from a fixed position and were not easily transportable. Further, there was the dilemma of transferring the tools from their place of storage to the holder. This was a problem that required exasperating time to locate the stored tools and then bringing the tools to a holder which when placed in position was not easily movable. As a result the housewife had to make many retraceable trips to the holder in order to utilize it.

The present invention eliminates the deficiencies in the garden holders by providing a tool holder that will act as both tool storage holder for garden tools as well as a tool working holder.

It is therefore an object of the present invention to provide a combination storage and working tool holder that is capable of storing garden tools as well as being used to hold the garden tools during the use thereof.

It is further another object of the present invention to provide a garden tool stand and holder that easily transports the garden tools from position to position.

Another object of the present invention is to provide a garden tool holder that is capable of holding a plurality of garden tools.

A further object of the present invention is to provide a holder that is capable of holding a plurality of garden tools by the handles of the garden tools as well as holding a handleless garden tool.

It is still a further object of the present invention to provide a combination tool rack and tool holder that is capable of engaging a garden tool holder and being easily transportable from position to position.

Other features and objects of the present invention will become apparent to those skilled in the art by the following detailed description of the present invention.

On the drawings:

FIGURE 1 is a front view of a garden tool transporting and holder assembly of the present invention;

FIGURE 2 is a top view of the garden tool transporting and holder assembly as shown in FIGURE 1 rotated 90°;

FIGURE 3 is a top view of a combination storage-work tool rack of the present invention;

FIGURE 4 is a side view of the combination storage-work tool rack of the present invention illustrated in FIGURE 3;

FIGURE 5 is a top view of another combination storage-work garden tool holder of the present invention;

FIGURE 6 is a side view of the combination storage-work garden tool holder of the present invention illustrated in FIGURE 5;

FIGURE 7 is a top view of a combination storage-work rack and holder barbecue implement of the present invention;

FIGURE 8 is a side view of the combination storage-work rack and holder of the present invention illustrated in FIGURE 7;

FIGURE 9 is a front elevational view of the combination storage-work rack garden tool and rack of the present invention illustrated by FIGURE 4 fastened on a pegboard storage wall;

FIGURE 10 is a side elevational view of another tool transporting and holder assembly of the present invention;

FIGURE 11 is a top view of the tool transporting and holder assembly of the present invention illustrated in FIGURE 10;

FIGURE 12 is a cross-sectional view of the present invention taken along lines XII—XII of FIGURE 10;

FIGURE 13 is a side view of another combination storage-work rack and holder constructed in accordance with the principles of the present invention; and FIGURE 14 is a partial bottom view of the combination storage-work rack and holder illustrated in FIGURE 13.

As shown on the drawings:

The present invention provides a garden tool holder that is used to both store garden tools, by being fastened to a pegboard storage wall, and transport garden tools without the necessity of removing the garden tools from the holder by being attached to a portable garden tool transport that allows the garden tools to be carried by the user. A housewife or other user can easily carry the garden tool transport and tool loaded tool holder from position to position. Therefore, the garden tools are always readily at the hand of the housewife where she needs them without the necessity of her having to clumsily carry them or to walk back and forth from where she is working to the place where the garden tools are.

Referring to FIGS. 1 and 2, there is illustrated a garden tool holder and transport assembly 21 having a combination storage-work garden tool holder 22 connected to a garden tool transport 23. The garden tool transport 23 is an integral one-piece unit, preferably formed from a rod. The rod is configured to provide a horizontal extending handle 24, a vertical holder mounting shaft 26, a horizontal shoulder 27, a vertical extension 28, a horizontal foot press 29, and a vertical support 30, all substantially in a single plane.

The handle is rounded at one end 31 to form the vertical shaft that extends perpendicularly downwards therefrom. The vertical shaft 26 is rounded at one end 32 to form the shoulder that is shorter than the handle and extends parallel to and toward the other end of the handle. The shoulder 27 is rounded at its other end 33 to form the vertical extension shaft that extends perpendicular thereto. The extension 28 is sized to suspend the tools over the earth at a height which is convenient for a kneeling person and is rounded at its other end 34 to form the foot press that extends parallel to and away from the handle. The foot press is rounded at its other end 36 to form the support 30 which extends perpendicular thereto. The support has a pointed other end 37 that allows the support to be pressed in the ground 38 with relative ease.

The holder 22 is preferably made of a single metal rod that is formed with a plurality of semi-circular tool supports 39 and has two vertical upwardly extending hooks 41 and 42 forming the respective ends of the holder. Each semi-circular tool support has two parallel legs 43 extending from an arcuate base 44 defining the mouth of the tool support.

Extending downwardly from the center of the storage-work holder 22 is a vertical holder support leg 46. The semi-circular supports 39 extend perpendicular to the support leg 46 and an equal number are formed on both sides of the support leg. The semi-circular supports are connected to the support legs by two converging legs 47. The semi-circular supports are interconnected to each other by two angular legs 48 and to the vertical end hooks by legs 49 which are perpendicular to the semi-circular parallel support legs 43.

The storage-work holder is so arranged that the hooks are used for holding tools with eyes or straps thereon, i.e. scissors and clippers while the semi-circular supports engage tools having graduated handles i.e. hand spade and hand fork. The supports 39 will allow the graduated garden tool handles to be slid into the mouth of the supports and then dropped to rest in the supports.

Illustrated by FIGURES 3–6, are two holders that may be used with the tool transport 23. FIGURES 3 and 4 illustrate a tool rack 51 used to hold various flat garden tools or accessories such as flower pots.

The storage-work rack 51 is formed by a flat rectangular base 52 having upturned vertical ends 53 and 54. On each side of the rectangular base, rods 56 and 57 pass through the upturned ends 53 and 54 forming railings 58 and 59 for the tray holder. On the rear end of the tray holder the rods 56 and 57 are bent towards one another to form rear arms 61 and 62. The rear arms are parallel to the rear upturned end 54 and decline convergingly towards the center of the rear end 54. They are attached to one another by suitable means, such as welding, and are bent to form a horizontal arm 63 which extends perpendicular to the upturned rear end 54. The arm 63 is downturned to form the vertical rack support 64.

FIGURES 5 and 6 illustrate a one-piece partially circular tool storage-work holder 66. The holder 66 is preferably constructed from a metal rod that is configured to a plurality of semi-circular tool supports 67 having parallel legs 68 extending from a semi-circular base 69. The supports 67 are joined to each other by arcuate joinders 71 which interconnect the parallel legs 68 of adjacent supports. The holder 66 is so arranged that the base 69 is lower than the arcuate joinders 71.

The outermost end of the joinders 71 are in the same plane and a line connecting these outermost ends forms an arc of a first circle. A concentric second arc of a circle is also formed by a line joining the innermost ends of the support bases 67. A pair of arms 72 are joined to the plurality of supports by arcuate end joinders 73. The arms 72 extend towards the center of the first circle and are slightly shorter than the radius thereof. These arms decline from the joinder 71 plane to meet at support base 69 plane.

They are attached by suitable means and downturned perpendicular to the arcuate support base plane to form a vertical holder support 74.

The declining tool supports 67 of the storage-work holder 66 to prevent the tool handles from accidentally sliding out of the tool supports.

The garden tool supports do not grip the garden tools but rather support the garden tools by their handles. The graduated garden tool handles prevent the garden tools from sliding downwardly through the semicircular supports. Therefore, it is seen that the garden tool holders of the present invention do not require a certain amount of flexibility in order to grip and properly hold the garden tools. Flexible garden tool grippers loosen after use and wear prematurely. The non-flexing of the garden tool supports of the present invention insures the garden holder of the present invention with a long life span.

Referring to FIGURE 9, the garden tool holders 22, 51 and 66 are used to store garden tools on a pegboard 75 which is attached to the cellar or garage wall. The pegboard 75 contains a plurality of holes 75a that have attached thereto cylindrical or other suitable attaching means 75b. The cylindrical attacher 75b may take the form of a helical spring, a cylindrical molded plastic tube, or a metal tube. The attacher 75b has a diameter slightly less than the width of the vertical holder support. The vertical holder support is inserted in the holder 75b and held thereby. The tool holder has tools thereon that it is storing on the pegboard.

When the housewife is ready to work on her flowers, she goes to the garage and removes the holder with the tools thereon, from the pegboard 75 and inserts the vertical holder support 46, referring to FIGURE 1, into a tubular spring 76 or any other suitable attacher such as a rubber grommet or ground rod fastener on the transport 23. The diameter of the cylindrical spring attacher 76 is slightly less than the combined diameter of the support 46 and holder rod portion 26 combined so that the garden tool holder 22 is press fitted into the transport. This arrangement of the garden tool holder and the cylindrical holder allows the garden tool holder to extend outwardly on a horizontal plane.

The housewife grasps garden tool handle 24 and carries the holder and garden tools to her flower beds. By placing her foot on the foot press 29 she is able to push the garden tool holder with a slight amount of pressure into the ground 38. The transport extension 28 holds the tools at the proper height for a kneeling housewife and ready for use at that particular location. Upon moving to another location, it is with a minimum amount of effort that the transport and tool holders are removed from the ground and ready for relocation in another working location. Therefore, it is seen that the present invention provides a garden tool holder that easily transports tools from place to place as well as storing them.

Referring to FIGURES 7 and 8 there is illustrated a combination rack-holder 77 which is utilized for holding various garden implements. The rack-holder comprises a flat base 78 with upturned ends 79 and 81. Extending through the upturned end rods 82 and 83 forming side rails on each side of the flat base 78. The rods 82 and 83 extend through the rear of the end 79 and are turned to form hook attachments 84 and 86 respectively. The rods 82 and 83 extend through the other end 81 and are bent through a series of curves to provide a plurality of semi-circular supports 87 each having a pair of parallel legs 88 and arcuate joinders 89. The parallel legs 88 incline from the arcuate portion of the supports to the arcuate joinder 89 to provide stability for the holder and also prevent the garden tools from being jarred loose from the rack-holder.

This type of rack-holder is for being hung on the side of the table or the like by its hook fasteners 84 and 86. It is, of course, understood that the hook fasteners 84 and 86 could be replaced by a vertical rack-holder support such as the holder support 64 on the rack 51, and be used in conjunction with the transport 23.

FIGURES 10–12 illustrate a further modification of the present invention. A combination rack and handle tool holder 91 is formed by a tray having a base 92 with upturned ends 93 and 94. The tray has side rails extending through the upturned ends thereof formed by rods 96 and 97. The rods 96 and 97 extend through the front upturned end 94 of the tray on each side thereof and transversely decline parallel to end 94 at 98 and 99 towards each other. They are attached by suitable means and bent to form a horizontal arm 101. The horizontal arm 101 extends perpendicular to the end 94 and is bent downwards at 102 to form a vertical holder support 103. The vertical holder support 103 is then bent and separated to form a pair of declining diverging legs 104. The legs 104 are then bent to form a plurality of semi-circular supports 106 each having a pair of parallel legs 107 with arcuate joinders 108. The semi-circular support part of the holder 91 being similar to the holder 66 in FIGURES 5 and 6. On the horizontal leg 101 and vertical leg 103 is placed a cylindrical coil spring attacher 109 or any suitable attacher.

This type of rack-holder is placed on a tripod stand 111 having a vertical extension shaft 112 with three diverging base legs 113, 114 and 116. The leg 113 is integral with and bent away from the vertical rod 112 while the legs 114 and 116 are pivotally connected to the vertical leg 112 by a cylindrical coil spring connector 117 which has an internal diameter to form a press fitting pivotal joint.

The stand 111 holds the rack-holder 91 by having the end 118 of the shaft 112 inserted into the vertical portion of the spring 109, as is illustrated in FIGURE 10. The rack-holder 91 suspends the garden tools (a hand spade 119 is shown for illustrative purposes only) above the earth at a convenient working height.

Referring to FIGURES 13 and 14, the combination rack-holder 77 may be adapted for transportation by the transport 111. This is accomplished by affixing a vertical rack-holder support 121 to approximately the center of the tray 78 base, eliminating the hooks 86, and having said vertical support extending approximately perpendicular to the tray base. A hole 122 is made in the tray adjacent the vertical support. This allows the vertical extension 112 to pass through the hole and the vertical support to be attached to the vertical extension by any suitable attaching means.

As is of course understood, that each transport means is capable of holding more than one garden tool holder. The tripod carrying means 111 could transport the holder illustrated in FIGURES 4 through 6 by merely placing a cylindrical spring holding element on the vertical rod 112 to be loosely fitted therewith. The spring element having a diameter which is less than the diameter of the vertical rod 113 and vertical holder support.

Also, it is understood that although the present invention was described with regard to garden tools, tools of any variety such as barbecue implements may be supported by the storage-work holders of the present invention. Further these holders and their related parts need not be made out of metal, but plastic or equivalent materials can be used to form the garden tool holders and transporting means.

Although minor modifications might be suggested by those versed in the art, it should be understood that I wish to embody within the scope of the patent warranted hereon all such embodiments as reasonably and properly come within the scope of my contribution to the art.

I claim as my invention:

1. A combination rack and tool holder for supporting tools comprising:
   a rectangular tray having an upturned front end and an upturned rear end,
   rail means passing through the upturned front and rear ends to form side rails for said tray,
   a plurality of interconnected semi-circular tool handle supports for engaging a tool handle to suspend the tool, and
   said rails extending through the rear upturned end to connect said semi-circular tool handle supports with said tray.

2. A combination rack and tool holder for supporting tools comprising:
   a rectangular tray having an upturned front end and an upturned rear end,
   rail means passing through the upturned front and rear ends to form side rails for said tray,
   a plurality of interconnected semi-circular tool handle supports for engaging a tool handle to suspend the tool,
   said semi-circular supports having an arcuate base and a pair of parallel legs,
   arcuate joinders interconnecting the parallel legs of adjacent supports,
   said support parallel legs inclining from said support arcuate base to said arcuate joinders, and
   said rails extending through the rear upturned end to connect said semi-circular tool handle supports with said tray.

3. A combination rack and tool holder for supporting tools comprising:
   a rectangular tray having an upturned front end and an upturned rear end,
   rail means passing through the upturned front and rear ends to form side rails for said tray,
   said rail means bent to extend substantially parallel to the upturned rear end and converge towards one another,
   a horizontal leg joining said converging rail means,
   a vertical rack support extending from said horizontal leg to attach the rack to a portable transport means,
   a plurality of interconnected semi-circular tool handle supports for engaging a tool handle to suspend the tool,
   said semi-circular supports having an arcuate base and a pair of parallel legs,
   arcuate joinders interconnecting the parallel legs of adjacent supports,
   said support parallel legs inclining from said support arcuate base to said arcuate joinders, and
   a pair of converging legs connecting the semi-circular supports to the vertical holder support.

4. An apparatus for hand carrying garden tools and the like and suspending the garden tools above the earth comprising:
   a horizontal handle,
   a vertical garden tool holder mounting shaft integral with said handle and extending substantially perpendicular thereto,
   a horizontal shoulder integral with said mounting shaft and extending substantially perpendicular thereto,
   a flexible cylindrical attacher mounted on said mounting shaft with its longitudinal movement being confined by the handle and the shoulder,
   a metal rod shaped to form a plurality of interconnected semi-circular tool handle supports adapted to engage a tool handle and thereby hold the tool,
   a vertical holder support fastened to said flexible attacher to hold the tools inserted in said semi-circular tool handle supports substantially perpendicular to the earth,
   a vertical extension integral with said shoulder and extending perpendicularly thereto,
   a horizontal foot press integral with said vertical extension and extending perpendicular thereto, and
   a vertical transport support integral with said foot press and extending substantially perpendicular thereto and having a sharp end for inserting said transport support into the earth.

5. An apparatus for hand carrying garden tools and the like and suspending the garden tools above the earth comprising:
   a horizontal handle,
   a vertical garden tool holder mounting shaft integral with said handle and extending substantially perpendicular thereto,
   a horizontal shoulder integral with said mounting shaft and extending substantially perpendicular thereto,
   a flexible cylindrical attacher mounted on said mounting shaft with its longitudinal movement being confined by the handle and the shoulder,
   a metal rod shaped to form a plurality of interconnected semi-circular tool handle supports adapted to engage a tool handle and thereby hold the tool, said rod having upturned ends to provide hooks for hanging tools thereon,
   a vertical holder support fastened to said flexible attacher to hold the tools inserted in said semi-circular tool handle supports substantially perpendicular to the earth,
   a vertical extension integral with said shoulder and extending perpendicular thereto,
   a horizontal foot press integral with said vertical extension and extending perpendicular thereto, and
   a vertical transport support integral with said foot press and extending substantially perpendicular thereto and having a sharp end for inserting said transport support into the earth.

6. A one-piece storage-work holder adapted to hold tools during their storage and their use comprising:
a rod having two upturned ends to provide hooks for hanging tools thereon,
a vertical holder support extending between said upturned ends for fastening the storage-work holder to a storage wall or a portable transport means,
said rod being shaped on each side of said vertical support to form a plurality of semi-circular tool handle supports extending perpendicular to said vertical support and adapted to engage a tool handle and thereby hold the tool,
said semi-circular supports having an arcuate base and a pair of parallel legs extending therefrom forming a tool entrance mouth,
a plurality of arcuate joinders interconnecting the parallel legs of adjacent supports,
said adjacent semi-circular supports on each side of the vertical support having their entrance mouth facing in opposite directions, and
a pair of converging legs connecting the semi-circular supports to the vertical holder support.

7. A one-piece rod storage work holder for supporting garden tools and the like comprising:
a vertical rod support means,
a rod having a ring-like shape formed by a plurality of interconnected bight tool supports, each bight tool support having an arcurate base and a pair of parallel legs inclining upwardly from said base to form a tool entrance mouth,
a plurality of arcuate joinders interconnecting the legs of adjacent bight supports, and
said ring-like rod being integral with said vertical rod support and being substantially perpendicular thereto.

8. A combination rack and tool holder for supporting garden tools and the like comprising:
a tray having an upturned front end and an upturned rear end,
rail means connecting the upturned front and rear ends to form side rails for said tray,
a plurality of interconnected bight tool handle supports for engaging a tool handle to suspend the tool, and
said rails extending through the rear upturned end to connect said bight tool handle supports with said tray.

9. A combination rack and tool holder for supporting garden tools and the like comprising:
a tray having an upturned front end and an upturned rear end,
rail means passing through the upturned front and rear ends to form side rails for said tray,
a plurality of interconnected bight tool handle supports for engaging a tool handle to suspend the tool,
said bight supports having a base and a pair of legs,
joinders interconnecting the parallel legs of adjacent supports,
said support parallel legs inclining from said support arcuate base to said arcuate joinders,
means extending from the rear upturned end to connect said semi-circular tool handle supports with said tray,
a vertical rod support connected to the bottom of said tray to extend substantially perpendicular thereto for connecting a portable transport means thereto, and
a hole in said tray adjacent said vertical rod support for allowing a portion of the transport means to pass therethrough.

10. A combination rack and tool holder for supporting garden tools and the like comprising:
a tray having an upturned front end and an upturned rear end,
rail means passing through the upturned front and rear ends to form side rails for said tray,
a plurality of interconnected bight tool handle supports for engaging a tool handle to suspend the tool,
said bight supports having a base and a pair of parallel legs,
arcuate joinders interconnecting the parallel legs of adjacent supports,
said support parallel legs inclining from said support arcuate base to said arcuate joinders,
said rails extending through the rear upturned end to connect said semi-circular tool handle supports with said tray, and
a vertical rod support connected to said tray to extend substantially perpendicular thereto to connect a portable transport means thereto.

11. An apparatus for hand carrying garden tools and the like and suspending the garden tools above the earth comprising:
a handle,
a vertical garden tool holder mounting shaft integral with said handle and extending substantially perpendicular thereto,
a flexible cylindrical attacher mounted on said mounting shaft with its longitudinal movement being confined by the handle,
a metal rod shaped to form a plurality of interconnected bight tool handle supports adapted to engage a tool handle and thereby hold the tool,
said rod having upturned ends to provide hooks for hanging tools thereon,
a vertical holder support fastened to said flexible attacher to hold the tools inserted in said bight tool handle supports substantially perpendicular to the earth,
a vertical extension integral with said mounting shaft,
a horizontal foot press integral with said vertical extension and extending substantially perpendicular thereto, and
a vertical transport support integral with said foot press and extending substantially perpendicular thereto and having a sharp end for inserting said transport support into the earth, 12. An apparatus for hand carrying garden tools and the like suspending the garden tools above the earth comprising:
a handle,
a vertical garden tool holder mounting shaft integral with said handle and extending substantially perpendicular thereto,
an attacher mounted on said mounting shaft with its longitudinal movement being confined by the handle,
a combination rack and tool holder having a rod shaped to form a plurality of interconnected bight tool handle supports adapted to engage a tool handle and thereby hold the tool,
a tray connected to said rod,
a vertical holder support connected to said combination rack and tool holder and fastened to said attacher to hold the tools inserted in said bight tool handle supports substantially perpendicular to the earth,
a vertical extension integral with said mounting shaft,
a horizontal foot press integral with said vertical extension and extending perpendicular thereto, and
a vertical transport support integral with said foot press and extending substantially perpendicular thereto and having a sharp end for inserting said transport support into the earth.

13. An apparatus for hand carrying garden tools and the like and suspending the tools above the earth comprising:
a handle,
a mounting shaft integral with said handle and extending substantially perpendicular thereto,
a flexible attacher mounted on said mounting shaft with its longitudinal movement being confined by the handle,
a rod shaped to form a plurality of interconnected semi-circular tool handle supports adapted to engage a tool handle and thereby hold the tool,
said semi-circular supports having an arcuate base and a pair of legs,
arcuate joinders interconnecting the parallel legs of adjacent supports,
said support legs inclining from said support arcuate base to said arcuate joinders,
a vertical holder support fastened to said flexible attacher to hold the tools inserted in said semi-circular tool handle supports substantially perpendicular to the earth,
a vertical extension integral with said mounting shaft,
a horizontal foot press integral with said vertical extension and extending perpendicular thereto, and
a vertical transport support integral with said foot press and extending substantially perpendicular thereto and having a sharp end for inserting said transport support into the earth.

References Cited in the file of this patent

UNITED STATES PATENTS

| | | |
|---|---|---|
| 1,356,487 | Cluxton | Oct. 19, 1920 |
| 1,447,579 | Thomas | Mar. 6, 1923 |
| 2,436,924 | Hansen | Mar. 2, 1948 |
| 2,963,248 | Anderson | Dec. 6, 1960 |
| 2,982,572 | Farber | May 2, 1961 |